Figure 1:
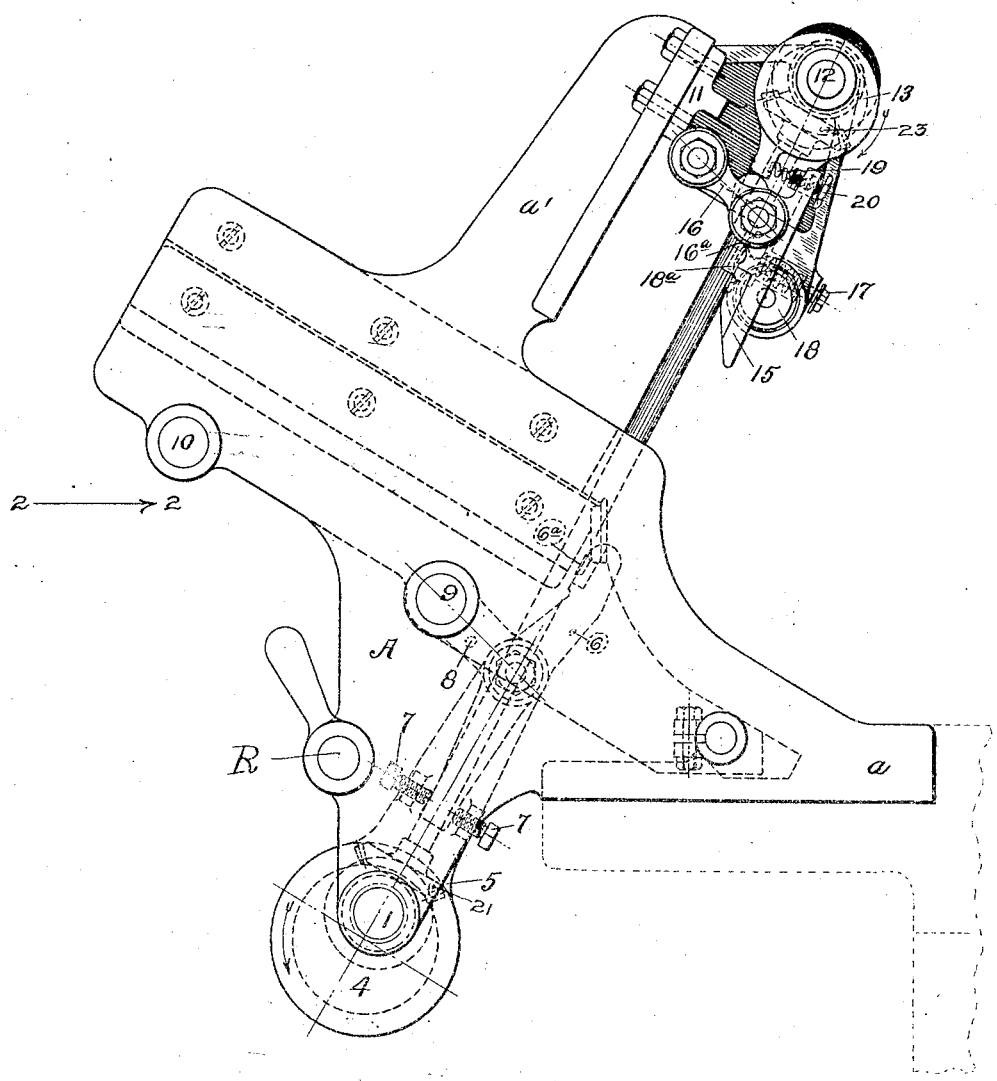

C. W. GRAHAM.
BLANK FEEDING MACHINE.
APPLICATION FILED JAN. 29, 1909.

983,822.

Patented Feb. 7, 1911.
5 SHEETS—SHEET 1.

Witnesses—

Inventor—
Charles W. Graham,
Attorneys.

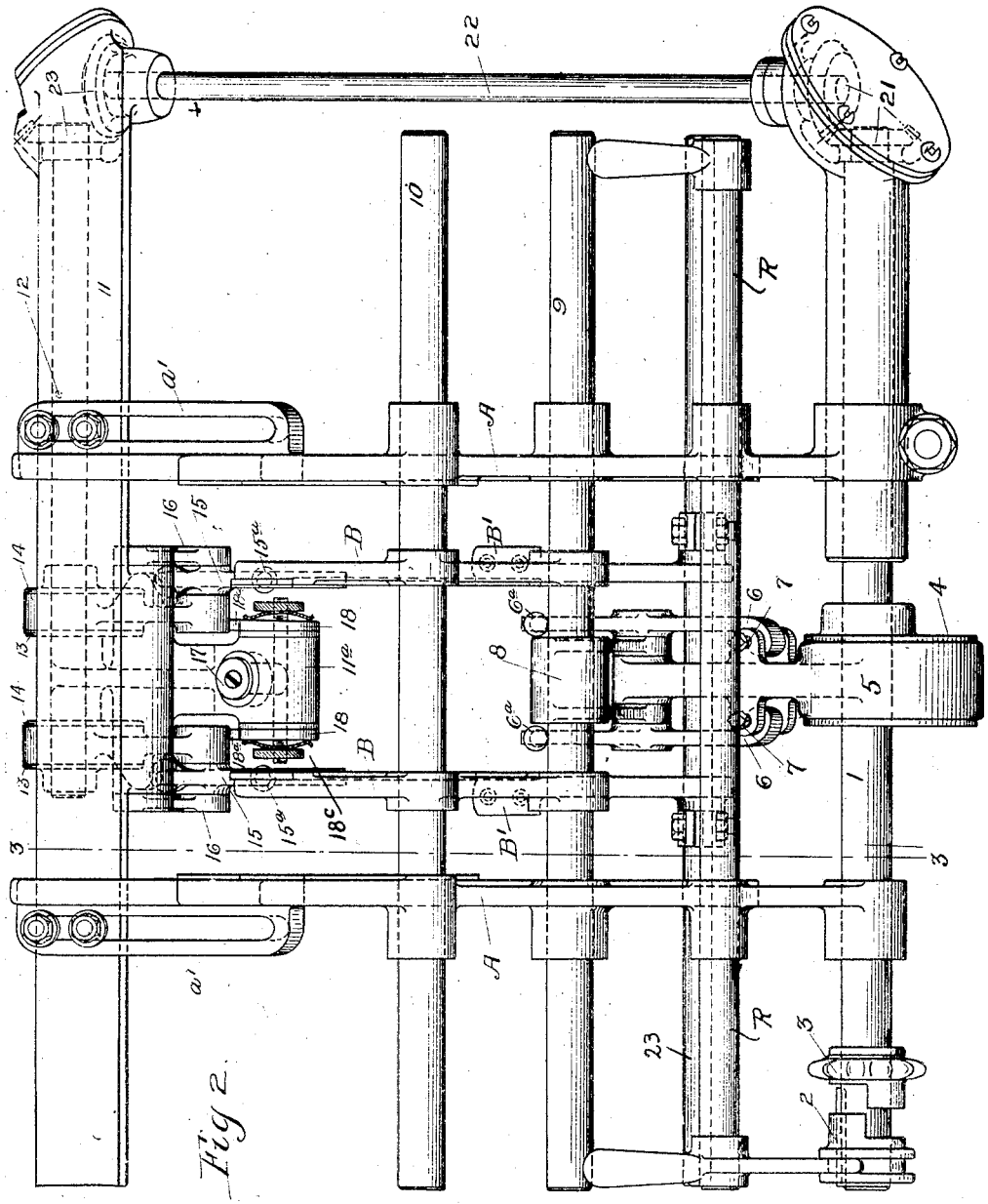

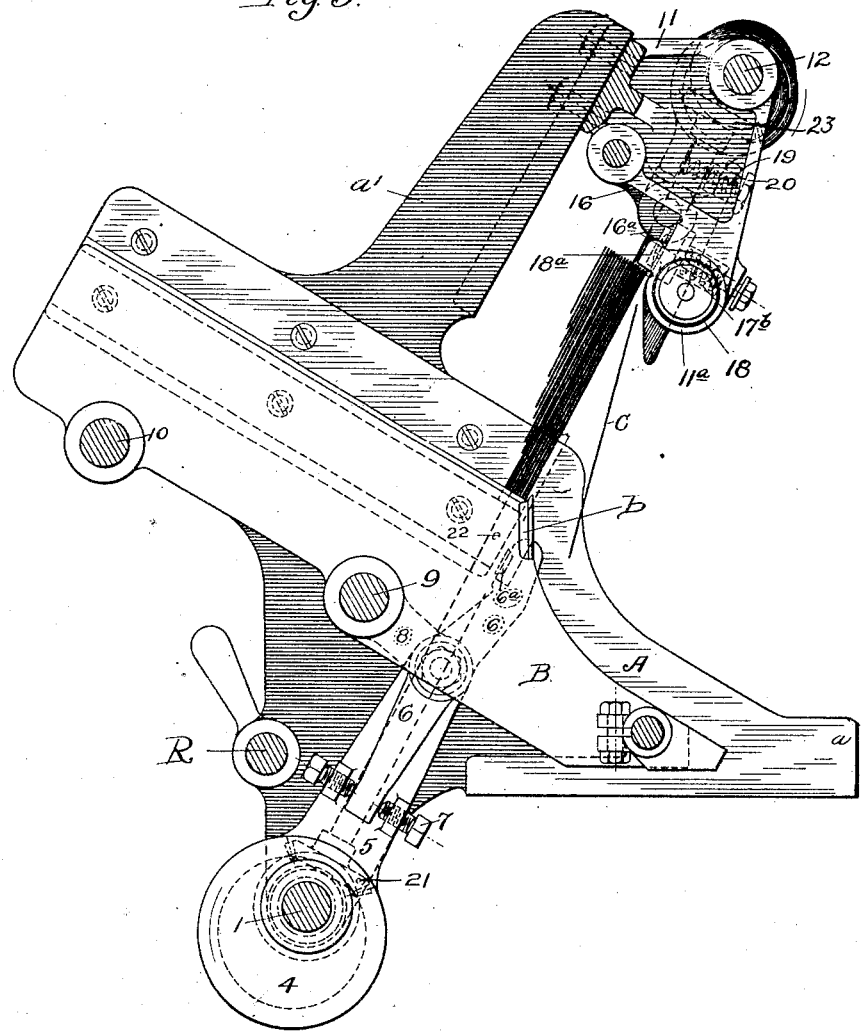

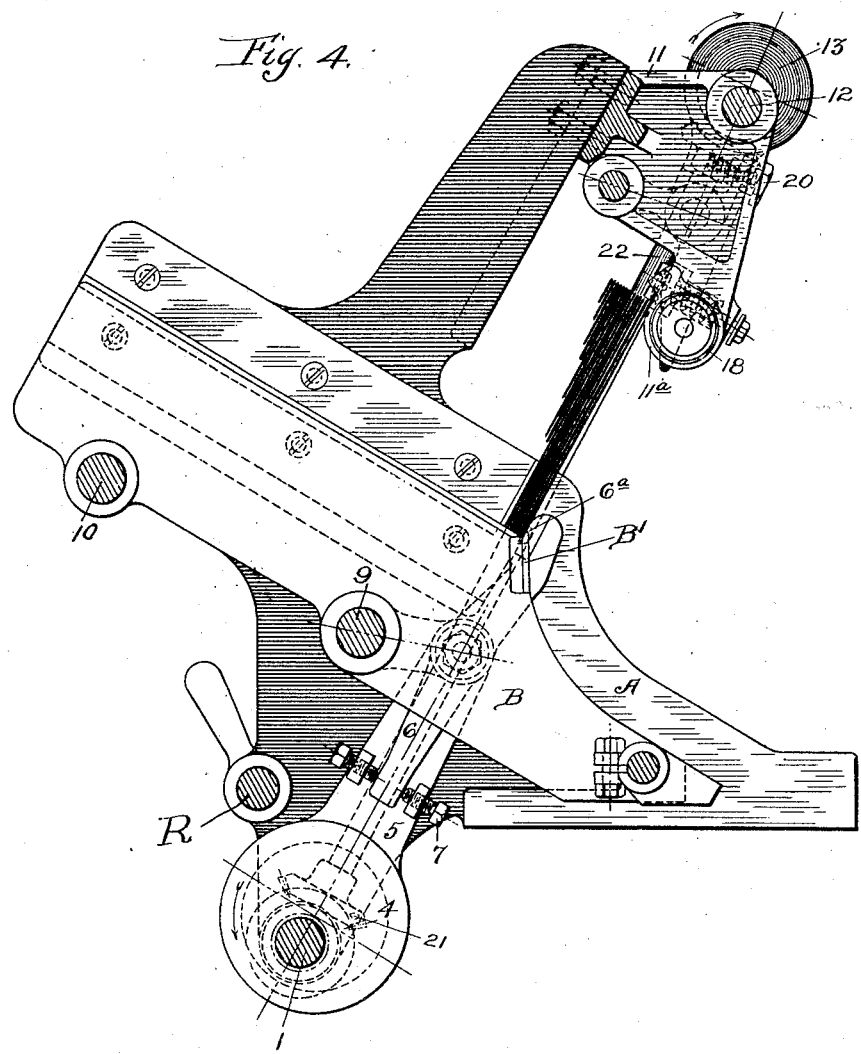

C. W. GRAHAM.
BLANK FEEDING MACHINE.
APPLICATION FILED JAN. 29, 1909.
983,822.
Patented Feb. 7, 1911.
5 SHEETS—SHEET 5.
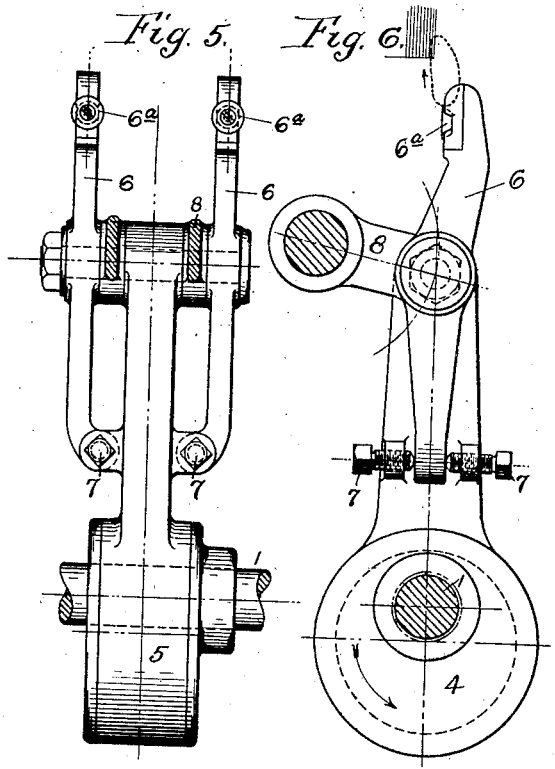
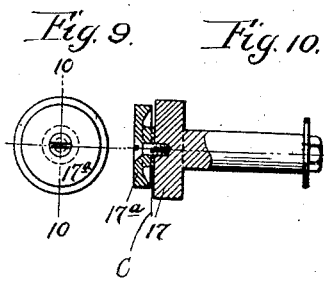
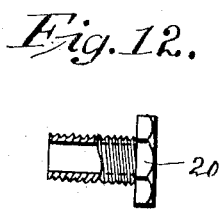
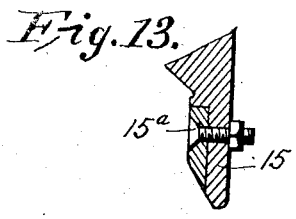
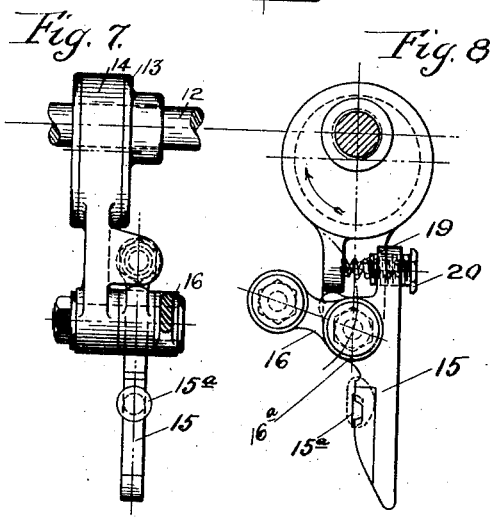
Witnesses—
J Clyde Ripley
Adele Honigsberg
Inventor—
Charles W. Graham,
BY
Urhon Kent & Ramsey
Attorneys.

UNITED STATES PATENT OFFICE.

CHARLES W. GRAHAM, OF ROME, NEW YORK, ASSIGNOR, BY MESNE ASSIGNMENTS, TO AMERICAN CAN COMPANY, OF NEW YORK, N. Y., A CORPORATION OF NEW JERSEY.

BLANK-FEEDING MACHINE.

983,822. Specification of Letters Patent. Patented Feb. 7, 1911.

Application filed January 29, 1909. Serial No. 475,029.

*To all whom it may concern:*

Be it known that I, CHARLES W. GRAHAM, residing at Rome, in the county of Oneida, State of New York, have invented certain new and useful Improvements in Blank-Feeding Machines, of which the following is a specification.

This invention relates to blank-feeding machines, and pertains more particularly to the type of machines in which the prepared blanks are arranged in a pack, that is, in superposed parallelism, immediately adjacent to mechanism which automatically removes a single blank from the face of the pack.

The principal object of the invention is to provide a machine of the above class whereby the foremost blank of a pack is moved away therefrom in a direction parallel to the plane of the pack, the said pack being held in with its edges substantially vertical, the latter arrangement being favored because thereby it is possible to feed in the blanks by gravity, and discharge them from the machine in a position whereby they may readily enter the body-forming or other machine to which the blank-feeding machine is preliminary. The said parallel movement of the foremost blank is important, because it minimizes the air pressure on the moving blank, a fact of the utmost importance in a high-speed machine. Further it is feasible to produce such movement of the blank with much less complicated machinery, and the action is noiseless to a degree.

Another leading object of the invention is to provide a device in which the parts are so related and arranged that the pack of blanks may be replenished as necessary while the machine is in operation, and performing its regular functions.

A further object of the invention is to provide adjustable means for supporting a pack of blanks, whereby the machine may be readily adapted for the handling of blanks of different widths, while at the same time the mechanisms which act on the blanks are adjustable and adjustably mounted in the frame of the machine, so that they may be easily adapted for operation upon blanks of different heights and thicknesses.

Another object is to provide improved operating mechanism proper, of such construction and relations as that there is a minimum of wear and noise in operation, superior maintenance of adjustments, and excellent alinement of parts.

A still further object is to provide such an arrangement of all the parts that the imparting of power and motion thereto may be accomplished in a very simple manner.

Another object is to provide a machine in which the parts especially subjected to wear are designed and constructed so as to permit of simple and instant adjustment or replacement.

In carrying out these and other aims of the invention in a concrete form, further improvements have been involved, consisting in novel structural details, novel methods of assembling parts, and novel methods of making and maintaining important adjustments, all of which are hereinafter fully described. In a general way, however, it may be stated that in attaining the objects set out I have provided a compact machine, into which prepared blanks, fed in at one side, move down an open-ended, open bottomed inclined way, the foremost blank resting against stop members above and below. Selector fingers, adapted for but a single blank are actuated to push the foremost blank up and away from the lower support, and into a separating or segregating device, where it is momentarily held suspended. At this time, an ejector device operating in alternation with and oppositely to said selector device, moves down and ejects the blank from the separator. The operating parts are actuated from a single prime mover continuously, and the connections are direct and simple, there being but two driven shafts.

The elements, combinations and arrangements of parts constituting the invention will be hereinafter fully described, and the scope of the protection claimed therefor succinctly defined in the annexed claims.

Mechanism embodying the preferred structural peculiarities of the different parts, the preferred disposition thereof, and exemplifications of the combinations forming the subject matter of my improvements are shown in the accompanying drawings, which are to be taken as a part of this specification, and in which:

Figure 1 is a side view of a blank-feeding machine embodying my improvements, with the parts shown in their normal relative positions, as when at rest, the blank-feeding machine being shown in combination and in its position relative to a machine for forming can bodies from prepared sheets or blanks of ordinary tin, the latter machine being indicated by dotted lines; Fig. 2 is a rear elevation of the machine shown in Fig. 1, the parts being in the same relative positions; Fig. 3 is a sectional side elevation on the line 3—3 of Fig. 2, all the parts occupying the same relative positions as in Figs. 1 and 2; said figure also illustrating a sheet of tin C falling from the machine after being released by the ejecting mechanism; Fig. 4 is a sectional side elevation similar to Fig. 3, but with the operating parts in opposite positions from those shown in the previous views. In this figure is also indicated the position of a sheet or blank when the operating parts are in their positions of this view; Figs. 5 and 6 are details of the selecting fingers and picker disks that operate to engage the foremost sheet or blank and place it in position for engagement by the ejector fingers; Fig. 6, in addition, shows the orbital path of the picker disks occasioned by one complete revolution of the drive-shaft; Figs. 7 and 8 are details of the ejector fingers and picker disks that operate to engage the blank after it has been segregated from the adjacent pack, ready for expulsion from the machine; Fig. 8 also shows the orbital path of the picker disks during one complete revolution of the drive-shaft; Figs. 9 and 10 are detail views of the device for holding a blank in its segregated position, prior to ejection from the machine, the sectional view being on line 10—10 of Fig. 9. Fig. 11 is a sectional detail of one of the selector fingers, showing the adjustable mounting of disks 6ª; Fig. 12 is a detail of the hollow adjusting screw 20; and Fig. 13 is a sectional detail of the ejector, showing the adjustable mounting of disk 15ª.

The reference letters and numerals herein used indicate respectively, the same parts in the several figures of the drawings. The curved arrows indicate, without further description, the direction of movements of parts; and where single figures of the drawings are referred to in this specification, such reference is only intended to point out a figure in which the specific parts referred to are well shown, and other figures may show the same part.

Referring now more specifically to the drawings, A indicates the main side frames of the machine, in which are journaled the drive-shafts, said frames being held in spaced relations, by means of tie-bars 9 and 10, Fig. 1. There are preferably formed on the frames A suitable extensions $a$, whereby the blank-feeding machine may be secured to another machine or to a base.

Journaled in lower extensions of the frames A is a main drive-shaft 1, extending on each side out beyond the normal adjustment of the frames, and having at one end an ordinary clutch-block 2, operated by reciprocation of a rod R slidable in frames A. Said shaft 1 is also provided with a driving sprocket 3 mounted to rotate freely when clutch-block 2 is out of engagement.

B indicates spaced alined supporting members for a pack of blanks, adjustably secured at one end, respectively, to the cross-rod 23, which latter is secured in the side frames A. Otherwise said members B are supported by the tie-bars 9 and 10, and it will be noted that the construction and arrangement are such that the members B bear an inclined relation to the normal position of the machine. One end of the way formed by said members B is open and unobstructed (see Fig. 2), and extends rearwardly of the machine, in convenient position for ready insertion of a pack of blanks, which, by gravity, move down the inclined way toward the selecting and ejecting devices, presently to be described, and which are located forwardly in the machine adjacently above and below the inner ends of members B.

It has been stated that one important feature of the invention is the fact that the foremost blank of the pack is slid up along the face of the pack in the operation of the machine. This is accomplished by the operation of selector means, now to be described.

Located approximately central on the main shaft 1 is an eccentric 4, carrying an eccentric strap and connecting-rod 5. Picker or selector fingers 6 are pivotally mounted on the end of the connecting rod 5, being held in their normal adjustment by set-screws 7 (Fig. 3). A restraining link 8 is hung on the laterally extending tie-bar 9, the outer end of said link pivotally engaging the upper end of connecting rod 5, controlling the movement thereof, and consequently determining the orbital path described by the picker fingers in the operation of the machine. The parts last set out are so related that the picker fingers 6 describe an orbital path as indicated by dotted line in Fig. 6, during one revolution of shaft 1. One side of the orbital path approaches a straight line during the period when the ends of the fingers are moving upward toward the foremost sheet or blank of the pack. It will be noted that the straight side of the orbital path lies a little back of the normal face of the pack and that the points of the fingers 6 are of a rounded form; this arrangement insures a firm contact of the upwardly moving finger 6 against the lower edge of the pack.

Located on the face of each finger 6 toward the pack is a circular disk 6ª, so mounted as to extend beyond the face of the finger a distance that is a little less than the thickness of one sheet of tin. As the advancing fingers 6 approach the tin, the disks 6ª engage the lowermost edge of the foremost sheet, and carry it along until they have reached the uppermost limit of their movement. The blank, C, being pushed along the face of the pack ahead of fingers 6, passes directly into a separator or segregating device, hereinafter described.

It is to be understood, of course, that the various parts are so relatively disposed that when a pack is on the members B the foremost blank will be in position to be acted upon by the selector mechanism, as described, and so that the operation of the fingers 6 slides the foremost blank up along the face of the remaining pack. The blank so moved up falls within the field of action of other means and mechanism, as follows: Referring to Fig. 2, 11 indicates a cross rail at the upper end of the machine, supported in adjustable relation to the frames A by means of the upward slotted extensions $a'$ thereof, in which the rail is held by suitable bolt fastenings. The rail 11, carries all the upper mechanism of the machine, consisting of a shaft 12 parallel to shaft 1 and driven therefrom by means of vertical connecting shaft 22 through gears 21, 23; eccentrics 13 mounted on shaft 12; eccentric straps 14, ejector fingers 15 operated by the straps, restraining links 16, blank separating or segregating head 17, and blank stops 18.

The ejector fingers 15 (Figs. 7 and 8) are pivotally mounted on the eccentric straps 14, and are yieldingly held in their normal working positions by means of the springs 19 (Figs. 1 and 8), acting against the hollow adjusting screw 20. Disks 15ª are arranged on the faces of the ejector fingers 15 in the same manner as described for the fingers 6. And it should be noted here that the disks 15ª, as well as the disks 6ª are adjustably held on their respective fingers, so that the extent of their projection therefrom may be varied at will to accommodate different thicknesses of blanks. It will be noted that the orbital paths of the picker disks 15ª are similar to those of the fingers 6, though in an opposite direction, so that in their return movement they are away from the tin and are not subjected to any wear or abrasion during this time. The mechanism is so arranged that while the fingers 6 are moving upwardly or toward the work, the fingers 15 are also moving upwardly, and while the fingers 6 are moving down on their return movement the fingers 15 are moving down to act on the blank moved up by fingers 6. The object and value of this alternate motion will be obvious when the operation of the machine as a whole is explained.

By referring to Figs. 9 and 10 the construction and operation of the separator device (so-called) will be readily understood. The separator as a whole is designated by the numeral 17. Secured to the front face of the separator head 17 is a disk 17ª, so constructed that an opening between this disk and the head extends circumferentially over the entire surface, thus providing a large surface to resist wear and abrasion. The annular groove thus formed in the head of the separator is just sufficient to admit one blank, opposite sides thereof being engaged by the head and disk, so that the engaged sheet is positively segregated from the blank immediately back of it. The disk 17ª is adjustably mounted on the head 17, so that the effective space between the two members may be varied to adapt the separator for holding blanks of different thicknesses. A coiled spring 17ᵇ (Fig. 3) tends to hold the flange of the head 17 in frictional contact with the pack of tin, so that the space between the disk 17ª and head 17 may be kept in proper position in relation to the edge of the sheet in case the edge of the sheet should be buckled or out of a straight line. The disk 17ª extending out over the pack, engages the second sheet thereof if it tends to follow the foremost and moving blank by frictional effort when the foremost blank is being moved upward by the fingers 6, thus restraining the second blank from movement.

In rapid operation it might sometimes happen that the friction of fingers 6 against the foremost sheet would be sufficient to move the blank upwardly a sufficient distance before the disks 6ª engaged the lower edge thereof to expose the edge of the second sheet, so that the said disks might engage the edge of the second sheet and tend to carry it along with the first into the separator, resulting in jamming the sheets and producing an interference in the regular and uniform operation of the machine. On this account retaining blocks 18 are provided, rotatably mounted one on each side of a depending member 11ª, the rotatability of said blocks being regulated by friction members 18ᶜ. Extensions 18ª of said blocks are adapted to rest on the top edge of the pack, the pack bearing against member 11ª, and said extensions are held in such position with greater friction than is produced by the faces of fingers 6 contacting with the lower face of the sheet but moving upward with the blank as soon as the latter is engaged by the disks 6ª. The extensions 18ª remain in this upward position while the sheet is being ejected and until the ends 16ª of the links in their downward movement strike them and move them to their normal position on the top of the pack. Any tendency of the second sheet to follow the foremost one in its upward movement on account of mere surface friction between the two blanks is prevented, as already explained, by the member 17ª of separator 17.

Referring now to Figs. 3 and 4, the general operation of the machine will be comprehended. For the purpose of general description and easy understanding, the machine will be considered as adapted to operate on sheets of ordinary tin plate. A pack of rectangular, accurately cut blanks or sheets is placed in the machine from behind, and stands on edge upon the inclined way B, the upper part of the forward sheet bearing against the supporting member 11ª, the same being an integral part of the cross rail 11. The lower part of the blank rests against retaining blocks B′, secured to the center supporting members B. The inclination of the members B is sufficient to cause the pack to feed forward automatically toward the mechanism, as blanks are removed thereby.

The operation of the fingers 6 upon the foremost blank of the pack is believed to be clear; but it may be noted that, because of the orbital path described by said fingers, the lower edge of the engaged sheet will be moved up and away from the stops B′, so when the fingers 6 recede on their path this edge of the blank will be entirely free, and the blank remains suspended by the pressure between the remaining pack and the extension 11ª of the cross rail 11. The fingers 6 having moved the blank up so that its upper edge rests in the separator, as already described, said fingers begin their return movement, while at the same time the ejector fingers 15 are advancing downward toward the upper edge of the blank, the face of the fingers 15 being held by frictional contact with the blank through the medium of the links 16 and spring 19. As the fingers 15 continue in their downward path, the disks 15ª will engage the blank resting in the separator and force it down beyond the frictional resistance, when it will drop on a curved way at the front of the machine and slide to the bed of the adjacent operating machine.

I desire it understood that I do not limit my claims to the details of construction shown, in which I have simply illustrated one way of embodying the creative part or conception of the invention in concrete form in a structure or machine. The described devices are simply embodiments of the invention which other structures might embody, and some of the parts, as also combinations of parts, might well be used without the others in different types of such machines, without departure from the purview of my invention, and I regard myself as entitled to such variations from the shown and described devices as fall within the scope of my invention as expressed in the claims. It is also to be understood that materials, sizes, and relativities of parts are unimportant, except as they are specified in the claims.

Having described my invention what I claim as new and desire to secure by Letters Patent is:

1. In a machine of the class described, means for holding a pack of blanks, continuously moving means for engaging one edge of the foremost blank and carrying the said blank into a separator, a separator formed to engage the opposite sides of the blank and means for ejecting said blank from the separating device.

2. In a machine of the class described, means for holding a pack of blanks, continuously moving means traveling in a path virtually parallel to the plane of the pack, for engaging one edge of the foremost blank and moving the said blank into a separating device, a separating device formed to engage the opposite sides of the blank, and means for ejecting said blank from the separating device.

3. In a machine of the class described, a separating device formed to engage opposite sides of a blank, means for holding a pack of blanks, means for engaging one edge of the foremost blank and moving said blank into the separating device, and continuously moving means traveling in a path virtually parallel to the plane of the pack for ejecting said blank from the machine.

4. In a machine of the class described, means for holding a pack of blanks, means continuously traveling in a path virtually parallel to the plane of the pack for engaging the foremost blank of the pack and moving the said blank into a separating device, a separating device and continuously moving means traveling in a path virtually parallel to the plane of the pack for ejecting said blank from the separating device.

5. In a machine of the class described, means for holding a pack of blanks, continuously moving means traveling in a plane virtually parallel to the pack for engaging one edge of the foremost blank of the pack and moving said blank into a separating device, a separating device, and means for engaging the opposite edge of said blank and ejecting the same from the separating device.

6. In a machine of the class described, means for holding a pile of blanks, continuously moving means traveling in a path virtually parallel to the plane of the pack for engaging one edge of the foremost blank of the pack and moving said blank into a separating device, a separating device and continuously moving means traveling in a path virtually parallel to the plane of the pack for engaging the opposite edge of said blank and ejecting same from the machine.

7. In a machine of the class described, means for holding a pack of blanks, a separating device formed to engage opposite sides of a blank, alternately operating means, the first of said means adapted to engage a blank of the said pack and move the same into the separating device, the second of said means adapted to engage said blank and eject it from the separating device.

8. In a machine of the class described, means for holding a pile of blanks, a separating device, and similar oppositely disposed operating means, one of said means adapted to engage one edge of the foremost blank and move the same into the separating device, and another of said means adapted to engage said blank and eject the same from the machine.

9. In a machine of the class described, means for holding a pack of blanks, a separating device, and similar oppositely disposed operating means, one of said means adapted to engage one edge of the foremost blank and move the same into the separating device, and another of said means adapted to engage one edge of said blank and eject the same from the separating device.

10. In a machine of the class described, means for holding a pack of blanks, a separating device, and similar oppositely disposed operating means, one of said means adapted to engage one edge of the foremost blank and move the same into the separating device, and another of said means adapted to engage the opposite edge of the said blank and eject same from the separating device.

11. In a machine of the class described, means for holding a pack of blanks, a separating device, and operating means moving continuously in paths practically parallel to the plane of the pack of blanks, adapted to engage one edge of the foremost blank, move the same into the separating device, engage the opposite edge of said blank, and eject the same from the separating device.

12. In a machine of the class described, means for holding a pack of blanks, a separating device, and similar oppositely disposed operating means moving continuously in paths practically parallel to the plane of the pack of blanks, one of said operating means adapted to engage the foremost blank and move the same into the separating device, and another of the said operating means adapted to engage said blank and eject the same from the separating device.

13. In a machine of the class described, means for holding a pack of blanks, a separating device, and similar oppositely disposed operating means moving continuously in paths practically parallel to the plane of the pack of blanks, one of said operating means adapted to engage one edge of the foremost blank and move same into the separating device, and another of said means engaging said blank and ejecting same from the separating device.

14. In a machine of the class described, means for holding a pack of blanks, a separating device, and similar oppositely disposed operating means moving continuously in paths practically parallel to the plane of the pack of blanks, one of said operating means adapted to engage one edge of the foremost blank, and move the same into the separating device, and another of said means adapted to engage one edge of said blank and eject the same from the separating device.

15. In a machine of the class described, means for holding a pile of blanks, a separating device, and similar oppositely disposed operating means moving continuously in paths practically parallel to the plane of the pack of blanks, one of said operating means adapted to engage one edge of the foremost blank and move the same into the separating device, and another of said operating means adapted to engage the opposite edge of said blank and eject the same from the machine.

16. In a machine of the class described, in combination, means for holding a pack of blanks, continuously moving blank selecting means positioned practically opposite one edge of the pack of blanks, separating means, and continuously moving ejecting means positioned opposite the opposite edge of said pack of blanks.

17. In a machine for feeding blanks, in combination, means for holding a pile of blanks, a separating device, a continuously rotating shaft, selector fingers actuated by said shaft, and adapted to engage the foremost sheet of the said pack and move the same into the separating device, and means for ejecting said sheet from the separating device.

18. In a machine for feeding blanks, in combination, means for holding a pile of blanks, a separating device, a continuously rotating shaft, an eccentric secured to said shaft, selector fingers actuated by said eccentric, and adapted to engage the foremost sheet of the pile of blanks and move the same into the separating device, and means for ejecting the said sheet from the separating device.

19. In a machine for feeding blanks, in combination, means for holding a pile of blanks, a separating device, a continuously rotating shaft, an eccentric secured to said shaft, pivotally mounted selecting fingers actuated by said eccentric and adapted to engage the foremost sheet of the pile of blanks and move the same into the separating device, and means for ejecting the said sheet from the separating device.

20. In a machine for feeding blanks, in combination, means for holding a pile of blanks, a separating device, a continuously rotating shaft, an eccentric secured to said shaft, pivotally mounted selecting fingers actuated by said eccentric, and adapted to engage the foremost sheet of the pack of blanks and move the same into the separating device and pivotally mounted ejector fingers for ejecting the said sheet from the machine.

21. In a machine for feeding blanks, in combination, means for holding a pile of blanks, a separating device, a continuously rotating shaft, an eccentric secured to said shaft, selector fingers actuated by said eccentric, and adapted to engage the foremost sheet of the pack and move the same into the separating device, and ejector fingers for ejecting said sheet from the separating device.

22. In a machine for feeding blanks, in combination, means for holding a pile of blanks, a continuously rotating shaft, an eccentric secured to said shaft, an eccentric strap, and pivotally mounted selecting fingers carried by said strap for selecting the foremost sheet from the pile of blanks.

23. In a machine for feeding blanks, in combination, means for holding a pile of blanks, a separating device, a continuously rotating shaft, an eccentric secured to said shaft, an eccentric strap, means carried by said strap for selecting the foremost sheet from the pile of blanks and moving the same into the separating device, and means for ejecting said blank from the separating device.

24. In a machine for feeding blanks, in combination, means for holding a pile of blanks, a separating device, a continuously rotating shaft, an eccentric secured to said shaft, an eccentric strap, selecting fingers carried by said strap for selecting the foremost sheet from the pile of blanks and moving the same into the separating device, and means for ejecting said blank from the separating device.

25. In a machine for feeding blanks, in combination, means for holding a pile of blanks, a separating device, a continuously rotating shaft, an eccentric secured to said shaft, an eccentric strap, pivotally mounted selecting fingers carried by said strap for selecting the foremost sheet from the pack of blanks and moving the same into the separating device, and means for ejecting said blank from the separating device.

26. In a machine for feeding blanks, in combination, means for holding a pack of blanks, a separating device, a continuously rotating shaft, an eccentric secured to said shaft, an eccentric strap, means carried by said strap for selecting the foremost sheet of the pack and moving the same into the separator, and ejector fingers adapted to engage said sheet and expel it from the separating device.

27. In a machine for feeding blanks, in combination, means for holding a pack of blanks, a separating device, a continuously rotating shaft, an eccentric secured to said shaft, an eccentric strap carrying selector fingers for engaging the foremost sheet of the pack and moving the same into the separator, and ejector fingers adapted to engage the said blank and expel it from the separating device.

28. In a machine for feeding blanks, in combination, means for holding a pile of blanks, a separator, a continuously rotating shaft, an eccentric secured to said shaft, an eccentric strap, pivotally mounted selector fingers carried by said strap for selecting the foremost sheet of the pack and moving the same into the separator, and ejector fingers adapted to engage the said blank and expel it from the separating device.

29. In a machine for feeding blanks, in combination, means for holding a pack of blanks, a separator, a continuously rotating shaft, an eccentric secured to said shaft, an eccentric strap, pivotally mounted selector fingers carried by said strap for selecting the foremost sheet of the pack and moving the same into the separator, and pivotally mounted ejector fingers adapted to engage said blank and expel it from the separating device.

30. In a machine for feeding blanks, in combination, means for holding a pile of blanks, a continuously rotating shaft, an eccentric secured to said shaft, an eccentric strap selector fingers carried by said strap, a controlling link, a blank separating device, and ejecting means.

31. In a machine for feeding blanks, in combination, means for holding a pile of blanks, continuously rotating shaft, an eccentric secured to said shaft, an eccentric strap, pivotally mounted selector fingers carried by said strap, a controlling link, a blank separating device, and ejecting means.

32. In a machine for feeding blanks, in combination, means for holding a pile of blanks, a continuously rotating shaft, an eccentric secured to said shaft, an eccentric strap, selector fingers carried by said strap, a controlling link, a blank separating device, and ejector fingers.

33. In a machine for feeding blanks, in combination, means for holding a pack of blanks, a continuously rotating shaft, an eccentric secured to said shaft, an eccentric strap, pivotally mounted selector fingers carried by said strap, a controlling link, a blank separating device, and ejector fingers.

34. In a machine for feeding blanks, in combination, means for holding a pile of blanks, a continuously rotating shaft, an eccentric secured to said shaft, an eccentric strap, pivotally mounted selector fingers carried by said strap, a controlling link, a blank separating device, and pivotally mounted ejector fingers.

35. In a machine for feeding blanks, in combination, means for holding a pile of blanks, a continuously rotating shaft, an eccentric mounted on said shaft, an eccentric strap, selector fingers carried by said strap, a controlling link, a blank separating device adapted to receive only one blank at a time, and blank ejector means.

36. In a machine for feeding blanks, in combination, means for holding a pile of blanks, a continuously rotating shaft, an eccentric mounted on said shaft, an eccentric strap, pivotally mounted selector fingers carried by said strap, adapted to receive only one blank at a time, together with blank ejector means.

37. In a machine for feeding blanks, in combination, means for holding a pack of blanks, a continuously rotating shaft, an eccentric mounted on said shaft, an eccentric strap, selector fingers carried by said strap, a controlling link, a blank separating device adapted to receive only one blank at a time, and blank ejector fingers.

38. In a machine for feeding blanks, in combination, means for holding a pack of blanks, a continuously rotating shaft, an eccentric mounted on said shaft, an eccentric strap, selector fingers carried by said strap, a controlling link, a blank separating device adapted to receive only one blank at a time, together with pivotally mounted blank ejector fingers.

39. In a machine for feeding blanks, in combination, means for holding a pile of blanks, a continuously rotating shaft, an eccentric mounted on said shaft, an eccentric strap, pivotally mounted selector fingers carried by said strap, a controlling link, a blank separating device adapted to receive only one blank at a time, together with blank ejector fingers.

40. In a machine for feeding blanks, in combination, means for holding a pile of blanks, a continuously rotating shaft, an eccentric mounted on said shaft, an eccentric strap, pivotally mounted selector fingers carried by said strap, a controlling link, a blank separating device, adapted to receive only one blank at a time, together with pivotally mounted ejector fingers.

41. In a machine for feeding blanks, in combination, means for holding blanks, a separating device, means for selecting the foremost blank and moving the same into the separating device, a continuously rotating shaft, eccentrics mounted on said shaft, and ejector fingers actuated thereby.

42. In a machine for feeding blanks, in combination, means for holding blanks, a separating device, means for selecting the foremost blank, and moving the same into the separating device, a continuously rotating shaft, eccentrics mounted on said shaft, and pivotally mounted ejector fingers actuated thereby.

43. In a machine for feeding blanks, in combination, means for holding blanks, a separating device, selector fingers for engaging the foremost blank of the pack, and moving the same into the separating device, a continuously rotating shaft, eccentrics mounted on said shaft, and ejector fingers actuated thereby.

44. In a machine for feeding blanks, in combination, means for holding blanks, a separating device, selector fingers for engaging the foremost blank of the pack, and moving the same into the separating device, a continuously rotating shaft, eccentrics mounted on said shaft, and pivotally mounted ejector fingers actuated thereby.

45. In a machine for feeding blanks, in combination, means for holding blanks, a separating device, pivotally mounted selector fingers for engaging the foremost blank of the pack and moving the same into the separating device, a continuously rotating shaft, eccentrics mounted on said shaft, and pivotally mounted ejector fingers actuated thereby.

46. In a machine for feeding blanks, in combination, means for holding blanks, a separating device pivotally mounted selector fingers for engaging the foremost blank of the pack and moving the same into the separating device, a continuously rotating shaft, eccentrics mounted on said shaft, and ejector fingers actuated thereby.

47. In a machine for feeding blanks, in combination, means for holding blanks, a separating device, means for engaging the foremost blank and moving the same into the separating device, a continuously rotating shaft, eccentrics mounted on said shaft, eccentric straps, and ejector means carried thereby.

48. In a machine for feeding blanks, in combination, means for holding blanks, a separating device, means for engaging the foremost blank and moving the same into the separating device, a continuously rotating shaft, eccentrics mounted on said shaft, eccentric straps, and ejecting fingers carried thereby.

49. In a machine for feeding blanks, in combination, means for holding blanks, a separating device, means for engaging the foremost blank and moving the same into the separating device, a continuously rotating shaft, eccentrics mounted on said shaft, eccentric straps, and pivotally mounted ejecting fingers carried thereby.

50. In a machine for feeding blanks, a combination, means for holding blanks, a separating device, selector fingers for engaging the foremost blank and moving the same into the separating device, a continuously rotating shaft, eccentrics mounted on said shaft, eccentric straps, and ejector means carried thereby.

51. In a machine for feeding blanks, in combination, means for holding blanks, a separating device, pivotally mounted selector fingers for engaging the foremost blank and moving the same into the separating device, a continuously rotating shaft, eccentrics mounted on said shaft, eccentric straps, and ejector means carried thereby.

52. In a machine for feeding blanks, in combination, means for holding blanks, a separating device, selector fingers for engaging the foremost blank and moving the same into the separating device, a continuously rotating shaft, eccentrics mounted on said shaft, eccentric straps, and ejecting fingers carried thereby.

53. In a machine for feeding blanks, in combination, means for holding blanks, a separating device, pivotally mounted selector fingers for engaging the foremost blank and moving the same into the separating device, a continuously rotating shaft, eccentrics mounted on said shaft, eccentric straps, and pivotally mounted ejecting fingers carried thereby.

54. In a machine for feeding blanks, in combination, means for holding blanks, a separating device, a continuously rotating shaft, means for engaging the foremost sheet and moving the same into the separating device, actuated by said shaft, a continuously rotating shaft, eccentrics mounted on said continuously rotating shaft, and means for ejecting the said sheet from the machine, said means being actuated by said eccentrics.

55. In a machine for feeding blanks, in combination, means for holding blanks, a separating device, a continuously rotating shaft, an eccentric mounted on said shaft, means for engaging the foremost sheet and moving the same into the separating device, actuated by said eccentric, a continuously rotating shaft, eccentrics mounted on said last named shaft, and means for ejecting the said sheet from the machine actuated by said second named shaft.

56. In a machine for feeding blanks, in combination, means for holding blanks, a separating device, a continuously rotating shaft, an eccentric mounted on said shaft, means for engaging the foremost sheet and moving the same into the separating device, actuated by said eccentric, a continuously rotating shaft, and ejector fingers for expelling the said sheet from the machine actuated by said second named shaft.

57. In a machine for feeding blanks, in combination, means for holding blanks, a separating device, a continuously rotating shaft, an eccentric mounted on said shaft, means for engaging the foremost sheet and moving the same into the separating device, actuated by said eccentric, a continuously rotating shaft, and pivotally mounted ejector fingers for expelling the said sheet from the machine actuated by said second named shaft.

58. In a machine for feeding blanks, in combination, means for holding blanks, a separating device, a continuously rotating shaft, an eccentric mounted on said shaft, an eccentric strap, means for engaging the foremost sheet of a pack and moving the same into the separating device, carried by said strap, a continuously rotating shaft and means for ejecting the said sheet from the machine actuated by said second named shaft.

59. In a machine for feeding blanks, in combination, means for holding blanks, a separating device, a continuously rotating shaft, an eccentric mounted on said shaft, an eccentric strap, selector fingers for engaging the foremost sheet of a pack and moving the same into the separating device, carried by said strap, a continuously rotating shaft and means for ejecting the said sheet from the machine actuated by said second named shaft.

60. In a machine for feeding blanks, in combination, means for holding blanks, a separating device, a continuously rotating shaft, an eccentric mounted on said shaft, an eccentric strap, adjustable selector fingers carried by said strap for engaging the foremost sheet of a pack and moving the same into the separating device, a continuously rotating shaft, and means for ejecting the said sheet from the machine actuated by said second named shaft.

61. In a machine for feeding blanks, in combination, means for holding blanks, a separating device, a continuously rotating shaft, an eccentric mounted on said shaft, an eccentric strap, pivotally mounted selector fingers carried by said strap for engaging the foremost sheet of a pack and moving the same into the separating device, a continuously rotating shaft, and means for ejecting the said sheet from the machine actuated by said second named shaft.

62. In a machine for feeding blanks, in combination, means for holding blanks, a separating device, a continuously rotating shaft, an eccentric mounted on said shaft, an eccentric strap, adjustable pivotally mounted selector fingers carried by said strap, for engaging the foremost sheet of a pack and moving the same into the separating device, a continuously rotating shaft, and means for ejecting the said sheet from the machine actuated by said second named shaft.

63. In a machine for feeding blanks, in combination, means for holding blanks, a separating device, a continuously rotating shaft, an eccentric mounted on said shaft, an eccentric strap, means carried by said strap for engaging the foremost sheet of a pack, and moving the same into the separating device, a continuously rotating shaft, eccentrics mounted on said shaft, and means for ejecting the said sheet from the machine actuated by said last named eccentrics.

64. In a machine for feeding blanks, in combination, means for holding blanks, a continuously rotating shaft, an eccentric mounted on said shaft, an eccentric strap, means carried by said strap, for engaging the foremost sheet of a pack and moving the same into the separating device, a continuously rotating shaft, eccentrics mounted on said shaft and ejector fingers for expelling the said sheet from the machine actuated by said last named eccentrics.

65. In a machine for feeding blanks, in combination, means for holding blanks, a separating device, a continuously rotating shaft, an eccentric mounted on said shaft, an eccentric strap, means carried by said strap for engaging the foremost sheet of a pack and moving the same into the separating device, a continuously rotating shaft, and pivotally mounted ejector fingers for expelling the said sheet from the machine actuated by said second named shaft.

66. In a machine for feeding blanks, in combination, means for holding blanks, a separating device, a continuously rotating shaft, an eccentric mounted on said shaft, an eccentric strap, selector fingers carried by said strap, for engaging the foremost sheet of a pack and moving the same into the separating device, a continuously rotating shaft, eccentrics mounted on said last named continuously rotating shaft, and means for ejecting the said sheet from the machine actuated by said last named eccentrics.

67. In a machine for feeding blanks, in combination, means for holding blanks, a separating device, a continuously rotating shaft, an eccentric mounted on said shaft, an eccentric strap, adjustable selector fingers, carried by said strap, for engaging the foremost sheet of a pack and moving the same into the separating device, a continuously rotating shaft, eccentrics mounted on said continuously rotating shaft, for ejecting the said sheet from the machine actuated by said last named eccentrics.

68. In a machine for feeding blanks, in combination, means for holding blanks, a separating device, a continuously rotating shaft, an eccentric mounted on said shaft, an eccentric strap, adjustable pivotally mounted selector fingers carried by said strap for engaging the foremost sheet of a pack and moving the same into the separating device, a continuously rotating shaft, eccentrics mounted on said continuously rotating shaft and means for ejecting the said sheet from the machine actuated by said last named eccentrics.

69. In a machine for feeding blanks, in combination, means for holding blanks, a separating device, a continuously rotating shaft, an eccentric mounted on said shaft, an eccentric strap, selector fingers carried by said strap, for engaging the foremost sheet of a pack and moving the same into the separating device, a continuously rotating shaft, eccentrics mounted on said continuously rotating shaft, and ejector fingers for expelling the said sheet from the machine actuated by said last named eccentrics.

70. In a machine for feeding blanks, in combination, means for holding blanks, a separating device, a continuously rotating shaft, an eccentric mounted on said shaft, an eccentric strap, selector fingers carried by said strap, for engaging the foremost sheet of a pack and moving the same into the separating device, a continuously rotating shaft, eccentrics mounted on said continuously rotating shaft, and pivotally mounted ejector fingers for expelling the said sheet from the machine actuated by said last named eccentrics.

71. In a machine for feeding blanks, in combination, means for holding blanks, a separating device, a continuously rotating shaft, an eccentric mounted on said shaft, an eccentric strap, pivotally mounted selector fingers carried by said strap for engaging the foremost sheet of a pack and moving the same into the separating device, a continuously rotating shaft, eccentrics mounted on said continuously rotating shaft and means for ejecting the said sheet from the machine actuated by said last named eccentrics.

72. In a machine for feeding blanks, in combination, means for holding blanks, a separating device, a continuously rotating shaft, an eccentric mounted on said shaft, an eccentric strap, pivotally mounted selector fingers carried by said eccentric for engaging the foremost sheet of a pack, moving the same into the separating device, a continuously rotating shaft, eccentrics mounted on said continuously rotating shaft, and ejector fingers for expelling the said sheet from the machine actuated by said last named eccentrics.

73. In a machine for feeding blanks, in combination, means for holding blanks, a separating device, a continuously rotating shaft, an eccentric mounted on said shaft, an eccentric strap, pivotally mounted selector fingers carried by said strap, for engaging the foremost sheet of a pack and moving the same into the separating device, a continuously rotating shaft, eccentrics mounted on said continuously rotating shaft, and pivotally mounted ejector fingers for expelling the said sheet from the machine actuated by said last named eccentrics.

74. In a machine for feeding blanks, in combination, means for holding a quantity of blanks, a separating device, a continuously rotating shaft, an eccentric mounted on said shaft, means actuated by said eccentric for engaging the foremost sheet of a pack and moving the same into the separating device and yieldingly mounted means for ejecting the said blank from the separating device.

75. In a machine for feeding blanks, in combination, means for holding a quantity of blanks, a separating device, a continuously rotating shaft, an eccentric mounted on said shaft, means actuated by said eccentric for engaging the foremost sheet of a pack and moving the same into the separating device and yieldingly mounted ejector fingers for discharging the said blank from the separating device.

76. In a machine for feeding blanks, in combination, means for holding a quantity of blanks, a separating device, a continuously rotating shaft, an eccentric mounted on said shaft, means actuated by said eccentric for engaging the foremost sheet of a pack and moving the same into the separating device and pivotally mounted and yieldingly operating ejector fingers for discharging the said blank from the separating device.

77. In a machine for feeding blanks, in combination, means for holding a quantity of blanks, a separating device, a continuously rotating shaft, an eccentric mounted on said shaft, an eccentric strap, means carried by said strap for engaging the foremost sheet of a pack and moving the same into the separating device and yieldingly mounted means for ejecting the said blank from the separating device.

78. In a machine for feeding blanks, in combination, means for holding a quantity of blanks, a separating device, a continuously rotating shaft, an eccentric mounted on said shaft, an eccentric strap, selector fingers carried by said strap for engaging the foremost sheet of a pack and moving the same into the separating device and yieldingly mounted means for ejecting the said blank from the separating device.

79. In a machine for feeding blanks, in combination, means for holding a quantity of blanks, a separating device, a continuously rotating shaft, an eccentric mounted on said shaft, an eccentric strap, adjustable selector fingers carried thereby for engaging the foremost sheet of a pack and moving the same into the separating device and yieldingly mounted means for ejecting the said blank from the separating device.

80. In a machine for feeding blanks, in combination, means for holding blanks, a separating device, a continuously rotating shaft, an eccentric mounted on said shaft, an eccentric strap, adjustable pivotally mounted selector fingers carried by said strap for engaging the foremost sheet of a pack and moving the same into the separating device, and yieldingly mounted means for ejecting the said sheet from the separating device.

81. In a machine for feeding blanks, in combination, means for holding blanks, a separating device, a controlling link, a continuously rotating shaft, an eccentric, an eccentric strap, means carried thereby for engaging the foremost blank and moving the same into the separating device, other controlling links, and continuously moving mechanism for ejecting the said sheet from the separating device.

82. In a machine for feeding blanks, in combination, means for holding a supply of blanks, a separating device, a controlling link, a continuously moving shaft, an eccentric, an eccentric strap, selecting fingers carried by said strap for engaging the foremost blank and moving the same into the separating device, other controlling links, and continuously moving mechanism for ejecting the said blank from the separating device.

83. In a machine for feeding blanks, in combination, means for holding a supply of blanks, a separating device, a controlling link, a continuously moving shaft, an eccentric, an eccentric strap, adjustable selecting fingers carried by said strap for engaging the foremost blank and moving the same into the separating device, other controlling links, and continuously moving mechanism for ejecting the said blank from the separating device.

84. In a machine for feeding blanks, in combination, means for holding a supply of blanks, a separating device, a controlling link, a continuously moving mechanism for engaging the foremost sheet and moving the same into the separating device, other controlling links, a continuously rotating shaft, an eccentric and mechanism actuated thereby for ejecting the said blank from the separating device.

85. In a machine for feeding blanks, in combination, means for holding a supply of blanks, a separating device, a controlling link, a continuously moving mechanism for engaging the foremost sheet and moving the same into the separating device, controlling links, a continuously rotating shaft, an eccentric, an eccentric strap, and means carried thereby for ejecting the said sheet from the separating device.

86. In a machine for feeding blanks, in combination, means for holding a supply of blanks, a separating device, a controlling link, a continuously moving mechanism for engaging the foremost sheet and moving the same into the separating device, controlling links, a continuously rotating shaft, an eccentric, an eccentric strap and ejector fingers carried thereby for delivering the said blank from the separating device.

87. In a machine for feeding blanks, in combination, means for holding a supply of blanks, a separating device, a controlling link, a continuously moving mechanism for engaging the foremost blank and moving the same into the separating device, controlling links, a continuously rotating shaft, an eccentric, an eccentric strap and yieldingly mounted ejector fingers carried thereby delivering the said blank from the separating device.

88. In a machine for feeding blanks, in combination, means for holding a supply of blanks, a separating device, a controlling link, a continuously rotating shaft, mechanism actuated thereby for engaging the foremost blank and moving the same into the separating device, controlling links, a continuously rotating shaft, an eccentric and mechanism actuated thereby for ejecting the said blank from the machine.

89. In a machine for feeding blanks, in combination, means for holding a supply of blanks, a separating device, a controlling link, a continuously moving shaft, an eccentric, an eccentric strap, means carried thereby for engaging the foremost blank and moving the same into the separating device, and controlling links, a continuously rotating shaft, an eccentric, an eccentric strap, and means for ejecting the said blank from the machine.

90. In a machine for feeding blanks, in combination, means for holding a supply of blanks, a separating device, a controlling link, a continuously moving shaft, an eccentric, an eccentric strap, selecting fingers carried thereby for engaging the foremost blank and moving the same into the separating device, controlling links, a continuously rotating shaft, an eccentric, an eccentric strap and ejector fingers carried thereby for delivering the said blank from the machine.

91. In a machine for feeding blanks, in combination, means for holding a supply of blanks, a separating device, a controlling link, a continuously moving shaft, an eccentric, an eccentric strap, adjustable selecting fingers carried thereby for engaging the foremost blank and moving the same into the separating device, controlling links, a continuously rotating shaft, an eccentric, an eccentric strap and yieldingly mounted ejector fingers carried thereby for delivering the said sheet from the machine.

92. In a machine for feeding blanks, in combination, means for holding a supply of blanks, means for engaging and moving the foremost blank, yielding means for retaining said blank in its normal position relatively to the pack, a separator, and means for discharging the said blank from the machine.

93. In a machine for feeding blanks, in combination, means for holding a supply of blanks, framework adjustable for different size blanks, continuously operating means for engaging the foremost blank, a cross rail mounted on said framework, said cross rail carrying means for ejecting the said blank from the machine.

94. In a machine for feeding blanks, in combination, means for holding a supply of blanks, framework adjustable for different size blanks, a continuously rotating shaft, operating means for engaging the foremost blank and a cross rail mounted on said framework, said cross rail carrying means for ejecting the said blank from the machine.

95. In a machine for feeding blanks, in combination, means for holding a supply of blanks, framework adjustable for different size blanks, a continuously rotating shaft, an eccentric on said shaft, means operated thereby for engaging the foremost sheet and a cross rail mounted on said framework, said cross rail carrying means for ejecting the said blank from the machine.

96. In a machine for feeding blanks, in combination, means for holding a supply of blanks, framework adjustable for different size blanks, a continuously rotating shaft, an eccentric on said shaft, an eccentric strap, selector fingers carried thereby for engaging the foremost blank, a cross rail mounted on said framework, and means carried by said cross rail for ejecting the said sheet from the machine.

97. A machine for feeding blanks, in combination, means for holding a supply of blanks, framework adjustable for different size blanks, a continuously rotating shaft, an eccentric on said shaft, eccentric strap, pivotally mounted adjustable selector fingers carried thereby for engaging the foremost sheet, a cross rail mounted on said framework, and means carried by said cross rail for ejecting the said blank from the machine.

98. In a machine for feeding blanks, in combination, means for holding a supply of blanks, framework adjustable for different size blanks, continuously operating means for engaging the foremost blank, a cross rail mounted on said framework, a continuously rotating shaft on said cross rail, and means for ejecting the said blank from the machine.

99. In a machine for feeding blanks, in combination, means for holding a supply of blanks, framework adjustable for different size blanks, continuously operating means for engaging the foremost sheet, a cross rail mounted on said framework, a continuously rotating shaft on said cross rail, and an eccentric on said shaft, and means actuated thereby for ejecting the said sheet from the machine.

100. In a machine for feeding blanks, in combination, means for holding a supply of blanks, framework adjustable for different size blanks, continuously operating means for engaging the foremost sheet, a cross rail mounted on said framework, a continuously rotating shaft on said cross rail, and an eccentric on said shaft, an eccentric strap and ejector fingers carried thereby for ejecting the said sheet from the machine.

101. In a machine for feeding blanks, in combination, means for holding a supply of blanks, framework adjustable for different size blanks, a continuously rotating shaft, means operated thereby for engaging the foremost blank, a cross rail mounted on said framework, a continuously rotating shaft on said cross rail and means actuated thereby for ejecting the said blank from the machine.

102. In a machine for feeding blanks, in combination, means for holding a supply of blanks, framework adjustable for different size blanks, a continuously rotating shaft, an eccentric on said shaft, means operated thereby for engaging the foremost blank, a cross rail mounted on said framework, a continuously rotating shaft on said cross rail, an eccentric on said shaft, and means actuated thereby for ejecting the said blank from the machine.

103. In a machine for feeding blanks, in combination, means for holding a supply of blanks, framework adjustable for different size blanks, a continuously rotating shaft, an eccentric on said shaft, an eccentric strap, selector fingers carried thereby for engaging the foremost blank, a cross rail mounted on said framework, a continuously rotating shaft on said cross rail, an eccentric on said shaft, an eccentric strap, and ejector fingers carried thereby for ejecting the said blank from the machine.

104. In a machine for feeding blanks, in combination, means for holding a supply of blanks, framework adjustable for different size blanks, a continuously rotating shaft, means operated thereby for engaging the foremost blank, a cross rail mounted on said framework, a continuously rotating shaft on said cross rail, an eccentric on said shaft, and means actuated thereby for ejecting the said blank from the machine.

105. In a machine for feeding blanks, in combination, means for holding a supply of blanks, framework adjustable for different size blanks, a continuously rotating shaft, an eccentric on said shaft, means operated thereby for engaging the foremost sheet, a cross rail mounted on said framework, a continuously rotating shaft on said cross rail, an eccentric on said shaft and means actuated thereby for ejecting the said blank from the machine.

106. In a machine for feeding blanks, in combination, means for holding a supply of blanks, framework adjustable for different size blanks, a continuously rotating shaft, an eccentric on said shaft, means operated thereby for engaging the foremost sheet, a cross rail mounted on said framework, a continuously rotating shaft on said cross rail, an eccentric on said shaft, an eccentric strap and ejector fingers carried thereby for discharging the said blank from the machine.

107. In a machine for feeding blanks, in combination, means for holding a supply of blanks, framework adjustable for different size blanks, a continuously rotating shaft, an eccentric on said shaft, an eccentric strap, pivotally mounted adjustable selector fingers carried thereby for engaging the foremost sheet, a cross rail mounted on said framework, a continuously rotating shaft on said cross rail, and means actuated thereby for ejecting the said blank from the machine.

108. In a machine for feeding blanks, in combination, means for holding a supply of blanks, framework adjustable for different size blanks, a continuously rotating shaft, an eccentric on said shaft, an eccentric strap, pivotally mounted adjustable selector fingers carried thereby for engaging the foremost sheet, a cross rail mounted on said framework, a continuously rotating shaft on said cross rail, an eccentric on said shaft and means operated thereby for ejecting the said blank from the machine.

109. In a machine for feeding blanks, in combination, means for holding a supply of blanks, framework adjustable for different size blanks, a continuously rotating shaft, an eccentric on said shaft, an eccentric strap, pivotally mounted adjustable selector fingers carried thereby for selecting the foremost sheet, a cross rail mounted on said framework, a continuously rotating shaft on said cross rail, an eccentric on said shaft, an eccentric strap, and ejector fingers carried thereby for ejecting the said blank from the machine.

110. Combined in a blank feeding machine, a support for a pack of blanks, means for moving the foremost of said blanks edgewise, and means for preventing said means from moving any but the foremost blank, said means comprising a rotating block having a part adapted to rest upon the top of the pack.

111. Combined in a blank feeding machine, a support for a pack of blanks, means for moving the foremost of said blanks edgewise and means for preventing said means from moving any but the foremost blank, said means comprising a rotating frictional block having a part adapted to rest upon the top of the pack.

112. Combined in a blank feeding machine, a support for a pack of blanks, means for moving the foremost of said blanks edgewise, means for preventing said means from moving any but the foremost blank, said means comprising a rotating frictional block having a part adapted to rest upon the top of the pack and means for regulating the friction of said block.

113. Combined in a blank feeding machine, a support for a pack of blanks, means for moving the foremost of said blanks edgewise, a rotating block having a part adapted to rest upon the top of the pack, and an ejecting means, said block adapted to be moved out of contact with the pack by the first movement of said foremost blank and to be returned to position thereon by the ejecting means.

114. Combined in a blank feeding machine, a finger, and means for moving the same in an orbital path, one side whereof is substantially a straight line.

115. Combined in a blank feeding machine, a support for a pack of blanks, a finger for moving the foremost of said blanks edgewise, and means for moving said finger in an orbital path one side of which is substantially a straight line.

116. Combined in a blank feeding machine, a support for a pack of blanks, a finger for moving the foremost of said blanks edgewise, an oppositely moving finger for moving said blank in an opposite direction, and means for moving said fingers in orbital paths, one side whereof respectively is a straight line.

117. Combined in a blank feeding machine, means for supporting a pack of blanks, means below said support for moving the foremost of said blanks edgewise, means above said support for moving said blanks edgewise, and intermediate means for preventing the introduction of more than one blank into the field of operation of said moving means.

118. Combined in a blank feeding machine, a support for a pack of blanks, selector means and ejector means having blank engaging movement in opposite directions and acting in alternation upon the foremost blank of the pack.

119. Combined in a blank feeding machine, a frame, a lower supporting member, an upper supporting member, selecting mechanism operating adjacent said lower supporting member and ejecting mechanisms operating adjacent said upper supporting member, said upper supporting member and said ejecting mechanisms being adjustable as to height in the frame.

120. Combined in a blank feeding machine, a finger for engaging a blank and a projecting disk on the face of said finger, and means for regulating the extent of its projection.

121. Combined in a blank feeding machine, a support for a pack of blanks, means for moving one of said blanks edgewise, a movable member adapted to rest upon the top of the pack, and an ejecting means, said member adapted to be moved out of contact with the pack by the first movement of said blank, and to be returned to position thereon by the ejecting means.

122. Combined in a blank feeding machine, a support for a pack of blanks, means for moving one of said blanks edgewise, a movable member adapted to rest upon an edge of the pack, and an ejecting means, said member adapted to be moved out of contact with the pack by the first movement of the blank, and to be returned to position thereon by the ejecting means.

123. Combined in a blank feeding machine, a finger, means for moving the finger in an orbital path, and controlling means whereby one side of said path is made substantially a straight line.

124. Combined in a blank feeding machine, a support for a pack of blanks, a finger for moving one of said blanks edgewise, a finger for moving said blank in another direction, and means for moving said fingers in orbital paths, one side whereof, respectively, is a straight line.

125. Combined in a blank feeding machine, a support for a pack of blanks, a finger for moving one of said blanks edgewise, a finger for moving said blank in the opposite direction, and means for moving said fingers in orbital paths, one side whereof, respectively is a straight line.

126. In a blank feeding machine, a separator comprising a head and a disk extending therefrom to form an annular groove, said disk being adjustable toward and from the head.

127. In a machine of the kind described, means for holding a pack of blanks on edge so that the pack will tend to move in one direction, a bearing member in the line of said movement, a separator between said bearing member and the pack, means for sliding the foremost of said blanks along the face of the pack so that one edge thereof will enter the separator and be held between the remainder of the pack and the bearing member, and means for moving the blank in a direction opposite to that of its first movement out of the separator and from between the pack and the bearing member.

128. In a machine of the kind described, means for holding a pack of blanks on edge so that the pack will tend to move in one direction, a bearing member in the line of said movement, a separator between said bearing member and the pack, and means for sliding the foremost of said blanks along the face of the pack so that one edge thereof will enter the separator and be held between the remainder of the pack and the bearing member, said separator having a portion extending over said remainder of the pack.

129. In a machine of the kind described, means for holding a pack of blanks on edge so that the pack will tend to move in one direction, a bearing member in the line of said movement, a separator between said bearing member and the pack, and means for sliding the foremost of said blanks along the face of the pack so that one edge thereof will enter the separator and be held between the remainder of the pack and the bearing member, said separator having a portion extending over said remainder of the pack and being spring pressed toward the pack.

130. In a blank feeding machine, in combination, means for supporting a pack of blanks, a separator for one of the blanks having a portion extending over the remainder of the pack, means for moving one of the blanks into the separator, and means for moving it out of the separator.

131. In a blank feeding machine, in combination, means for supporting a pack of blanks, a separator for one of the blanks having a portion extending over the remainder of the pack, a movable block resting upon the pack, means for moving one of the blanks into the separator, and means for moving it out of the separator.

132. In a blank feeding machine, in combination, means for supporting a pack of blanks, means for removing one of said blanks from the pack, and a guard block capable of movement to two positions with respect to the pack, said block being moved to one of its positions by a moving part of the machine.

133. In a machine of the kind described, means for supporting a pack of blanks on edge, a separator adapted to engage opposite sides of a blank, means for engaging and moving the foremost of said blanks edgewise along the face of the pack and into the separator, and means for moving the blank out of the separator in a direction substantially parallel but opposite to that of its first movement.

In testimony whereof I affix my signature in the presence of two witnesses.

CHARLES W. GRAHAM.

Witnesses:
KATHARINE MACMAHON,
ADELE HONIGSBERG.